United States Patent
Krishnan et al.

(10) Patent No.: US 11,228,066 B2
(45) Date of Patent: Jan. 18, 2022

(54) MIST ELIMINATION SYSTEM FOR ELECTROCHEMICAL CELLS

(71) Applicant: Form Energy, Inc., Somerville, MA (US)

(72) Inventors: Ramkumar Krishnan, Scottsdale, AZ (US); Joel Hayes, Chandler, AZ (US); Scott Klug, Mesa, AZ (US); Patrick Samuleson, Phoenix, AZ (US); Craig Trzebny, Phoenix, AZ (US)

(73) Assignee: FORM ENERGY, INC., Somerville, MA (US)

( * ) Notice: Subject to any disclaimer, the term of this patent is extended or adjusted under 35 U.S.C. 154(b) by 187 days.

(21) Appl. No.: 16/318,560

(22) PCT Filed: Jul. 24, 2017

(86) PCT No.: PCT/US2017/043500
§ 371 (c)(1),
(2) Date: Jan. 17, 2019

(87) PCT Pub. No.: WO2018/018037
PCT Pub. Date: Jan. 25, 2018

(65) Prior Publication Data
US 2019/0221907 A1    Jul. 18, 2019

Related U.S. Application Data
(60) Provisional application No. 62/365,924, filed on Jul. 22, 2016.

(51) Int. Cl.
*H01M 12/02* (2006.01)
*H01M 12/08* (2006.01)
(Continued)

(52) U.S. Cl.
CPC .......... *H01M 12/02* (2013.01); *H01M 12/06* (2013.01); *H01M 12/08* (2013.01); *H01M 50/35* (2021.01);
(Continued)

(58) Field of Classification Search
CPC ................................................. H01M 50/394
See application file for complete search history.

(56) References Cited

U.S. PATENT DOCUMENTS

| 5,093,213 A | 3/1992 | O'Callaghan |
| 5,506,067 A | 4/1996 | Tinker |

(Continued)

FOREIGN PATENT DOCUMENTS

| CN | 1535489 A | 10/2004 |
| CN | 1543685 A | 11/2004 |

(Continued)

OTHER PUBLICATIONS

International Search Report & Written Opinion of the International Searching Authority issued in International Application No. PCT/US2017/043500 dated Nov. 29, 2017.

(Continued)

*Primary Examiner* — Jonathan Crepeau
(74) *Attorney, Agent, or Firm* — Pillsbury Winthrop Shaw Pittman, LLP

(57) ABSTRACT

An electrochemical cell includes a mist elimination system that prevents mist from escaping from the cell chamber and conserves moisture within the cell. An exemplary mist elimination system includes a spill prevention device that reduces or prevents an electrolyte from escaping from the cell chamber in the event of an upset, wherein the electrochemical cell is tipped over. A mist elimination system includes a recombination portion that reacts with hydrogen to produce water, that may be reintroduced into the cell (Continued)

chamber. A mist elimination system includes a neutralizer portion that reacts with an electrolyte to bring the pH closer to neutral, as acid/base reaction. A mist elimination system includes a filter that captures mist that may be reintroduced into the cell chamber. A mist elimination system includes a hydrophobic filter on the outer surface to prevent water and other liquids from entering into the mist elimination system.

18 Claims, 7 Drawing Sheets

(51) Int. Cl.
*H01M 12/06* (2006.01)
*H01M 50/35* (2021.01)
*H01M 50/392* (2021.01)
*H01M 50/30* (2021.01)

(52) U.S. Cl.
CPC ....... *H01M 50/392* (2021.01); *H01M 50/394* (2021.01); *Y02E 60/10* (2013.01)

(56) References Cited

U.S. PATENT DOCUMENTS

| | | | |
|---|---|---|---|
| 8,168,337 | B2 | 5/2012 | Friesen et al. |
| 8,309,259 | B2 | 11/2012 | Friesen et al. |
| 8,491,763 | B2 | 7/2013 | Friesen |
| 8,492,052 | B2 | 7/2013 | Friesen |
| 8,659,268 | B2 | 2/2014 | Krishnan et al. |
| 8,877,391 | B2 | 11/2014 | Friesen et al. |
| 8,895,197 | B2 | 11/2014 | Friesen et al. |
| 8,906,563 | B2 | 12/2014 | Friesen et al. |
| 8,911,910 | B2 | 12/2014 | Krishnan et al. |
| 9,214,708 | B2 | 12/2015 | Friesen et al. |
| 9,269,996 | B2 | 2/2016 | Friesen et al. |
| 9,269,998 | B2 | 2/2016 | Hayes et al. |
| 2010/0316935 | A1 | 12/2010 | Friesen et al. |
| 2011/0070481 | A1 | 3/2011 | Liang et al. |
| 2011/0070506 | A1 | 3/2011 | Friesen et al. |
| 2011/0700481 | | 3/2011 | Liang et al. |
| 2011/0250512 | A1 | 10/2011 | Friesen et al. |
| 2012/0015264 | A1 | 1/2012 | Friesen et al. |
| 2012/0068667 | A1 | 3/2012 | Friesen et al. |
| 2012/0202127 | A1 | 8/2012 | Friesen et al. |
| 2012/0321969 | A1 | 12/2012 | Friesen et al. |
| 2013/0095393 | A1 | 4/2013 | Friesen et al. |
| 2013/0115523 | A1 | 5/2013 | Friesen et al. |
| 2013/0115525 | A1 | 5/2013 | Friesen et al. |
| 2014/0262760 | A1* | 9/2014 | Hayes ................ H01M 2/1258 204/276 |
| 2016/0293978 | A1 | 10/2016 | Krishnan et al. |

FOREIGN PATENT DOCUMENTS

| | | |
|---|---|---|
| CN | 101142706 A | 3/2008 |
| CN | 103400947 A | 11/2013 |
| JP | 1-163977 A | 6/1989 |
| JP | 10-509554 A | 9/1998 |
| WO | 02/01666 | 1/2002 |

OTHER PUBLICATIONS

International Preliminary Report on Patentability issued in International Application No. PCT/US2017/043500 dated Jul. 23, 2018.
Office Action dated May 27, 2020 issued in corresponding Indian Patent Application No. 201817034674 (7 pgs.).
Non-Final Office Action dated Oct. 8, 2019 issued in corresponding Japanese Patent Application No. 2018-550404 with English translation.
Office Action dated May 7, 2021, issued in corresponding Chinese Patent Application No. 201780034966.9, with English translation (23 pgs.).

* cited by examiner

MIST ELIMINATION SYSTEM FOR ELECTROCHEMICAL CELLS

CROSS-REFERENCE TO RELATED APPLICATIONS

This application is a national stage entry of PCT/US2017/043500, filed Jul. 24, 2017, which in turn claims priority to provisional patent application 62/365,924 filed on Jul. 22, 2016. The subject matter of each of these applications is incorporated herein by reference in its entirety.

BACKGROUND

Field

The present disclosure is directed to mist elimination and water management systems for electrochemical cells, and more particularly to electrochemical cells comprising air breathing cathodes and utilizing a liquid ionically conductive medium.

Background

Many types of electrochemical cells utilize a liquid ionically conductive medium to support electrochemical reactions within the cell. Electrochemical cells may utilize an air breathing electrode coupled to a fuel electrode, comprising any suitable fuel. For example, a metal-air electrochemical cell system may comprise a plurality of cells, each having a fuel electrode serving as an anode at which metal fuel is oxidized, and an air breathing oxidant reduction electrode at which oxygen from ambient air is reduced. The liquid ionically conductive medium in such cells may communicate the oxidized/reduced ions between the electrodes.

In various ionically conductive mediums, evaporation, electrolysis (e.g. water splitting on recharge or self-discharge, or other loss of moisture from the ionically conductive medium may be detrimental to the electrochemical cell, particularly for cells requiring water to operate. In some electrochemical cell systems, various gasses may evolve during the charging and/or discharging of the cell. Such gasses may be harmful to the cell, and may damage or impede performance of the cell. For example, an electrochemical cell may be harmed due to the evolved gasses increasing pressure within a confined volume within the cell. In some cases, the cell, and potentially its surroundings, may be harmed due to the evolution of a potentially volatile gas or combination of gasses. As such, some electrochemical cells are configured to disperse such gasses by including vents therein, so that gasses may escape into the ambient environment. For example, U.S. patent application Ser. No. 13/566,948, now issued U.S. Pat. No. 9,214,708 to Fluidic Inc., incorporated herein in its entirety by reference, discloses a membrane gas vent configured to disperse gases out of an electrochemical cell. As another example, U.S. patent application Ser. No. 13/666,864, now issued U.S. Pat. No. 9,269,996 to Fluidic Inc., incorporated herein in its entirety by reference, discloses a hydrophilic gas vent configured to disperse gases out of an electrochemical cell. Other electrochemical cells may be configured with pressure relief valves, which are typically closed under normal pressure condition but open when the pressure within the cell exceeds a threshold amount. A pressure relief valve may simply allow a short term flow of gas from the cell until the pressure is reduced below a threshold limit.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. patent application Ser. No. 12/776,962, now issued U.S. Pat. No. 8,895,197 to Arizona Board of Regents, incorporated herein by reference.

In some electrochemical cell systems comprising liquid electrolytes, various gases evolved may entrain small amounts of liquid electrolyte therein which may be harmful to the cell and surroundings due to the emission of the resulting mist, aerosol or spray. The present application endeavors to provide an effective and improved way of capturing mists or aerosols created by the generation of gas bubbles within a volume of liquid electrolyte in an electrochemical cell and returning the liquid portion of the mist back to the main volume of the liquid electrolyte while dispersing the gas portion of the mist into the ambient environment.

Metal-air electrochemical cells are utilized in a wide variety of environmental conditions, including very hot and dry environments. Metal-air electrochemical cells in arid environments may have limited effectiveness and/or life as a result of the loss of moisture from the liquid ionically conductive medium. It is therefore particularly important to conserve moisture within the cells when operating in arid conditions.

SUMMARY

The disclosure is directed to an electrochemical cell, such as a metal-air electrochemical cell having a mist elimination system. Metal-air electrochemical cells, such as rechargeable metal-air batteries, produce a mist from the ionically conductive media, or electrolyte during normal cycling conditions. Self-discharge of the metal fuel electrode can generate hydrogen bubbles while charging of the metal fuel electrode by reducing metal fuel ions in the electrolyte is balanced by the evolution of oxygen gas on the positive electrode via the oxidation of water or hydroxide ions. The evolved gasses coalesce to form bubbles which will burst at the surface of the electrolyte and create a fine mist of electrolyte entrained in the gas effluent exiting the cell through the cell vent. Without a mist elimination system, the mist will be carried out of the cell through the exhaust vent and thereby decrease the volume of electrolyte.

It is important to conserve the electrolyte within the cell, especially in arid environments. An exemplary mist elimination system in accordance with embodiments of this disclosure comprises a spill prevention device, a filter, a recombination portion, a neutralizer portion and a hydrophobic filter. An exemplary filter captures the mist and may return the mist to the cell. A spill prevention device, such as a tortuous path vent or valve, is used to prevent or substantially prevent liquid electrolyte from freely flowing out of the cell in the event of an upset. An exemplary recombination portion comprises a recombination catalyst that reacts with the hydrogen gas to form water. An exemplary neutralizer portion reacts with an acidic or caustic electrolyte to neutralize it. An exemplary hydrophobic filter is configured on the outside of the mist elimination system and prevents or substantially prevents liquid water from entering the cell.

The electrochemical cell of the present disclosure may, in accordance with embodiments, further comprise a moisture, i.e. water, and carbon dioxide management system, as describe in U.S. provisional patent application No. 62/365,866, the entirety of which is hereby incorporated by reference herein. An exemplary moisture and carbon dioxide management system may be utilized in various electrochemical cells, including metal air cells having a liquid electrolyte, fuel cells, polymer electrolyte membrane (PEM), fuel cells and particularly alkaline fuel cells. An exemplary water and carbon dioxide system comprises a humidity exchange membrane (HEM), for transfer moisture from airflow from the electrochemical cell to air inflow to the cell. An exemplary water and carbon dioxide system may comprise a scrubber that removes carbon dioxide from the air inflow prior to it being deliver to the electrochemical cell. Many electrochemical reactions benefit from an oxygen rich air supply or an air flow with reduced carbon dioxide. An exemplary water and carbon dioxide system may comprise a recirculation valve, wherein at least a portion of the air exiting the electrochemical cell is recirculated back into the air inflow to the cell. Many electrochemical cells produce heat and an exhaust flow that is high in humidity and therefore conserving this moisture through recirculation can effectively conserve the moisture in the system.

A variety of water management techniques are described herein. U.S. patent application Ser. No. 15/077,341, to Fluidic Inc., filed on Mar. 22, 2016, entitled Water Management System In Electrochemical Cells with Vapor Return Comprising Air Electrodes describes some other water management systems and techniques and is incorporated, in its entirety, by reference herein.

The summary of the disclosure is provided as a general introduction to some of the embodiments of the disclosure, and is not intended to be limiting. Additional example embodiments including variations and alternative configurations of the disclosure are provided herein.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure.

DETAILED DESCRIPTION OF THE ILLUSTRATED EMBODIMENTS

Figure 2:
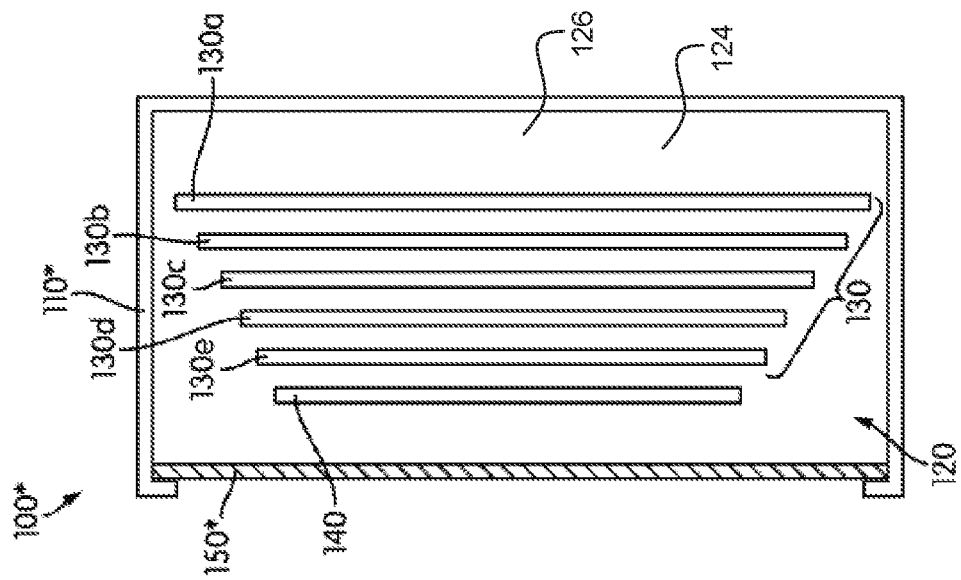
FIG. 2 depicts a schematic view of an electrochemical cell having an oxidant reduction electrode which defines a boundary wall for the electrochemical cell.

Corresponding reference characters indicate corresponding parts throughout the several views of the figures. The figures represent an illustration of some of the embodiments of the present disclosure and are not to be construed as limiting the scope of the disclosure in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the disclosure. This description should be read to include one or at least one and the singular also includes the plural unless it is obvious that it is meant otherwise.

Certain exemplary embodiments of the present disclosure are described herein and are illustrated in the accompanying figures. The embodiments described are only for purposes of illustrating the present disclosure and should not be interpreted as limiting the scope of the disclosure. Other embodiments of the disclosure, and certain modifications, combinations and improvements of the described embodiments, will occur to those skilled in the art and all such alternate embodiments, combinations, modifications, improvements are within the scope of the present disclosure.

An exemplary mist elimination system in accordance with embodiments of this disclosure is configured to control the loss of liquid ionically conductive medium, such as an electrolyte, from the electrochemical cell, which may be in the form of a mist or cell gas or vapor. A mist elimination system may comprise a safety vent, baffle or valve, a filter, a hydrogen recombination catalyst, a neutralizer and a hydrophobic filter or any combination thereof, for example. An exemplary mist elimination system in accordance with embodiments of this disclosure prevents or substantially prevents leaks of a liquid ionically conductive medium, or electrolyte in the event of an upset of the cell, and conserves moisture by draining captured moisture as well as chemically formed water, back into the cell.

In an exemplary embodiment, a mist elimination system comprises a spill prevention device, such as a safety vent, baffle or valve, to prevent or substantially prevent liquid from leaking from the cell in the event of an upset. In an exemplary embodiment, a safety valve includes a spherical stop that is free to move within a conduit having a sealing seat on at least the downstream side of the valve, whereby if the cell is upset, the liquid medium therein will flow into the conduit and force the spherical stop against the spherical seat and thereby plug and stop (or substantially stop) the flow of liquid from the cell. Under normal operation however, air flows around the spherical stop to vent the cell. In another exemplary embodiment, a vent having a tortuous path conduit prevents or substantially prevents liquid electrolyte from directly leaking out of the cell and into the filter. The safety vent may comprise a conduit that spirals or otherwise traverses to prevent (or substantially prevent) and reduce any hydrostatic head on the filter and remainder of the mist elimination system in the event of an upset, wherein the cell falls and liquid electrolyte is in direct contact with the safety vent. In an embodiment, an exemplary mist elimination system, or a spill prevention device of a mist elimination system, may be closed and sealed during shipping, such as by being plugged or otherwise covered and sealed. A pressure relief valve may be configured to release pressure from within the cell during shipping as well as during operation and may be configured to open when the pressure within the cell exceeds a threshold value.

An exemplary mist elimination system in accordance with embodiments of this disclosure comprises a filter, which may be configured downstream of the safety vent and may comprise a non-woven or woven filter media, or membrane. In an exemplary embodiment, the filter is a concave filter as described in U.S. Pat. No. 9,269,998, to Fluidic Inc., issued on Feb. 23, 2016 and entitled Concave Gas Vent For Electrochemical Cell; the entirety of which is incorporated by reference herein. An exemplary filter comprises a filter body portion comprised of at least one layer so as to absorb a portion of the ionically conductive liquid or mist. The body portion is formed in a concave shape with an apex positioned towards the top of the cell in its upright orientation, and with body surfaces extending downwardly from said apex so as to drain absorbed ionically conductive medium back into the interior chamber. The body portion contains pores so as to permit permeation of the gas therethrough. The filter may be highly efficient at removing mist and vapor that passes through the safety vent, such as more than about 80% efficient, more than about 90% efficient, more than about 95% efficient, more than about 99% efficient and any range between and including the efficiency values provided.

In an embodiment, the filter layer may be at least partially hydrophobic which may facilitate coalescence and liquid droplet drainage as discussed previously. As a non-limiting example, the filter layer may comprise a polypropylene felt. Such a material may be a non-uniform mat of random fibers formed by needle punching, in accordance with terms known in the textile arts. In various embodiments, the filter material may be in felt shape (i.e. flexible) or may be sintered to form a rigid porous layer, or be an arrangement of these materials. The filter layer 85 may comprise any suitable material. Non-limiting examples of such material include, but are not limited to: polypropylene, polyethylene, polyesters, fluoropolymers, acrylonitrile butadiene styrene (ABS), and Noryl (i.e. modified polyphenylene ether), combinations and derivatives thereof. In some embodiments, at least a portion of the material may be modified by surface treatments (e.g. modifying the hydrophobicity/hydrophilicity). In some embodiments the filter may comprise porous metal foams, including but not limited to comprising metals such as steel, stainless steel, bronze, and copper, and may in some embodiments be coated with a metal layer such as nickel and its alloys.

An exemplary mist elimination system in accordance with embodiments of this disclosure comprises a hydrogen recombination portion comprising a recombination catalyst that reacts with hydrogen/oxygen that may be formed from self-discharging or overcharging of the cell. The hydrogen recombination catalyst may be any suitable catalyst that will react with hydrogen to form water in the presence of oxygen, or other support media. Exemplary recombination catalyst includes, but is not limited to, perovskites, spinels, precious metal based-platinum, palladium etc., $MnO_2$, nickel or a combination of these. An exemplary recombination portion may be configured downstream of the spill prevention device and the filter to protect the recombination catalyst from direct exposure to the electrolyte liquid.

An exemplary mist elimination system in accordance with embodiments of this disclosure comprises a neutralizer that reacts with any liquid ionically conductive medium in the gas that passes through the mist elimination system. Neutralize, as used herein, means to react the liquid ionically conductive medium, in mist or gas phase, with a neutralization media, produce products of the reaction that are near neutral pH, such as to between 4 and 10, and more preferably between 5 and 9, and even more preferably between 6 and 8, in some embodiments. For example, neutralization media comprising an acid may be used to react with any caustic electrolyte, such as potassium hydroxide, KOH. A neutralizer may comprise a solid acid, or an acid supported on carbon or other support media. An acid may be coated onto a carbon or other support material, for example. A neutralizer may be configured with granulated or powder neutralizer media and may be in the form of a packed bed. The neutralizer may be configured in a neutralizer module that is replaceable, as the neutralizer media will be consumed in the reaction with the ionically conductive media, and therefore require replenishment. An exemplary neutralizer portion may be configured downstream of the spill prevention device, the filter and the recombination portion. An exemplary neutralizer may comprise one or more of the following acids: citric, oaxalic, carboxylic, sulfamic, benzoic, boric, sulfuric, hydrochloric, and nitric acid.

An exemplary mist elimination system in accordance with embodiments of this disclosure comprises a hydrophobic filter that may be configured at the exit of the mist elimination system, to both keep any liquid from escaping the cell through the hydrophobic filter and to prevent or substantially prevent water from getting into the cell from the environment. A hydrophobic filter may comprise a fluoropolymer, such as a microporous fluoropolymer membrane, an expanded fluoropolymer membrane such as expanded polytetrafluoroethylene (PTFE) membrane, a polymer membrane, foam, woven media or non-woven media and the like. A microporous media or membrane may have a mean flow pore size, as measured by a Coulter porometer and/or according to ASTM F 316, Standard Test Methods for Pore Size Characteristics of Membrane Filters by Bubble Point and Mean Flow Pore Test, that is less than about 5 um, less than about 2 um, or less than 1 um. These membranes may be inherently hydrophobic or may comprise a hydrophobic coating that reduces the surface energy of the media to prevent or substantially prevent liquid water wet-out.

A mist elimination system in accordance with embodiments of this disclosure may comprise multiple layers of one or more elements including the vent baffle or valve, a filter, a hydrogen recombination catalyst, a neutralizer and a hydrophobic filter, to ensure mist elimination and in some cases to provide a factor of safety. For example, two or more layers of hydrophobic filter media may be incorporated into the mist elimination module. In another embodiment, that entire composite stack, or portion thereof is replicated in a separate layer.

Various portions of the electrochemical cell 100 may be of any suitable structure or composition, including but not limited to being formed from plastic, metal, resin, or combinations thereof. Accordingly, the cell 100 may be assembled in any manner, including being formed from a plurality of elements, being integrally molded, or so on. In various embodiments the cell 100 and/or the housing 110 may include elements or arrangements from one or more of U.S. Pat. Nos. 8,168,337, 8,309,259, 8,491,763, 8,492,052, 8,659,268, 8,877,391, 8,895,197, 8,906,563, 8,911,910, 9,269,996, 9,269,998 and U.S. Patent Application Publication Nos. 20100316935, 20110070506, 20110250512, 20120015264, 20120068667, 20120202127, 20120321969, 20130095393, 20130115523, and 20130115525, each of which are incorporated herein in their entireties by reference.

Figure 1:
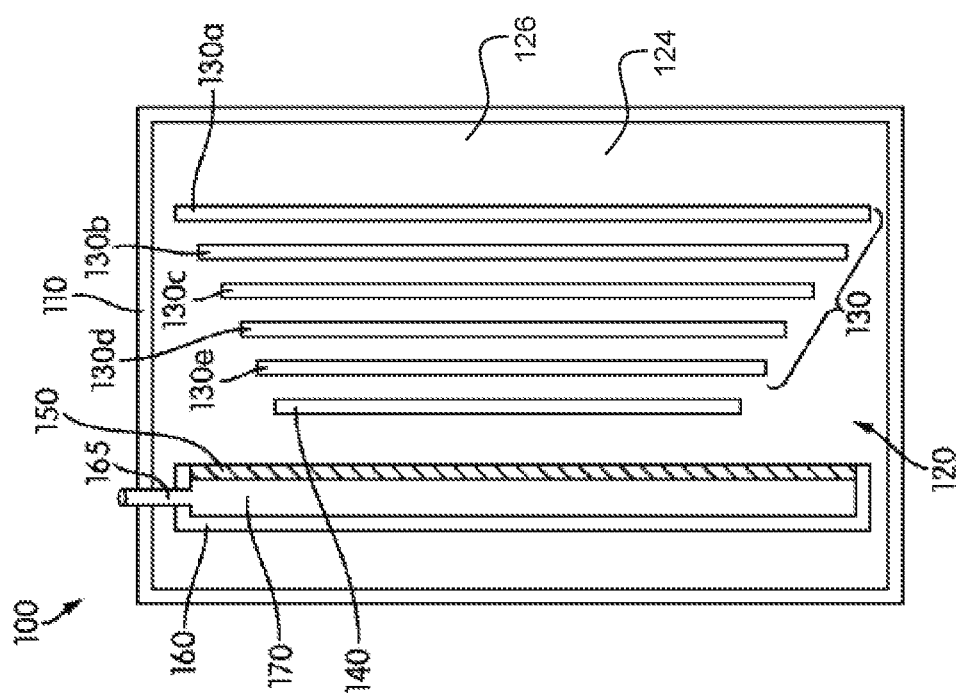
FIG. 1 depicts a schematic view of an electrochemical cell having an immersed oxidant reduction electrode.

FIG. 1 illustrates a schematic cross sectional view of an electrochemical cell 100. As shown, the components of the electrochemical cell 100 may be contained at least partially in an associated housing 110. The cell 100 utilizes a liquid ionically conductive medium 124, such as an electrolyte 126, that is contained within the housing 110, and is configured to circulate therein to conduct ions within the cell 100. While at times the ionically conductive medium may be generally stationary within the housing 110, such as in a stagnant zone, it may be appreciated that the cell 100 may be configured to create a convective flow of the ionically conductive medium. In some embodiments, the flow of the ionically conductive medium may be a convective flow generated by bubbles of evolved gas in the cell 100, such as is described in U.S. patent application Ser. No. 13/532,374 incorporated above in its entirety by reference. These bubbles may create a mist of the liquid ionically conductive medium that is carried to an exemplary mist elimination system, as described herein.

Although in the illustrated embodiment of FIG. 1 the cell housing is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 2, another embodiment of the cell 100 (specifically, cell 100*) is presented, whereby an oxidant reduction electrode 150* defines a boundary wall for the cell chamber 120, and is sealed to a portion of a housing 110* so as to prevent or substantially prevent seepage of ionically conductive medium therebetween. Such a configuration is generally not preferred, however, due to concerns that a failure of the oxidant reduction electrode 150* would result in leakage of the ionically conductive medium out of the cell 100*. Regardless, in some such embodiments the convective flow of the ionically conductive medium in the cell chamber 120, described in greater detail below, may be in a direction upwards and away from the oxidant reduction electrode 150*, across the top of the fuel electrode 130.

Figure 3:
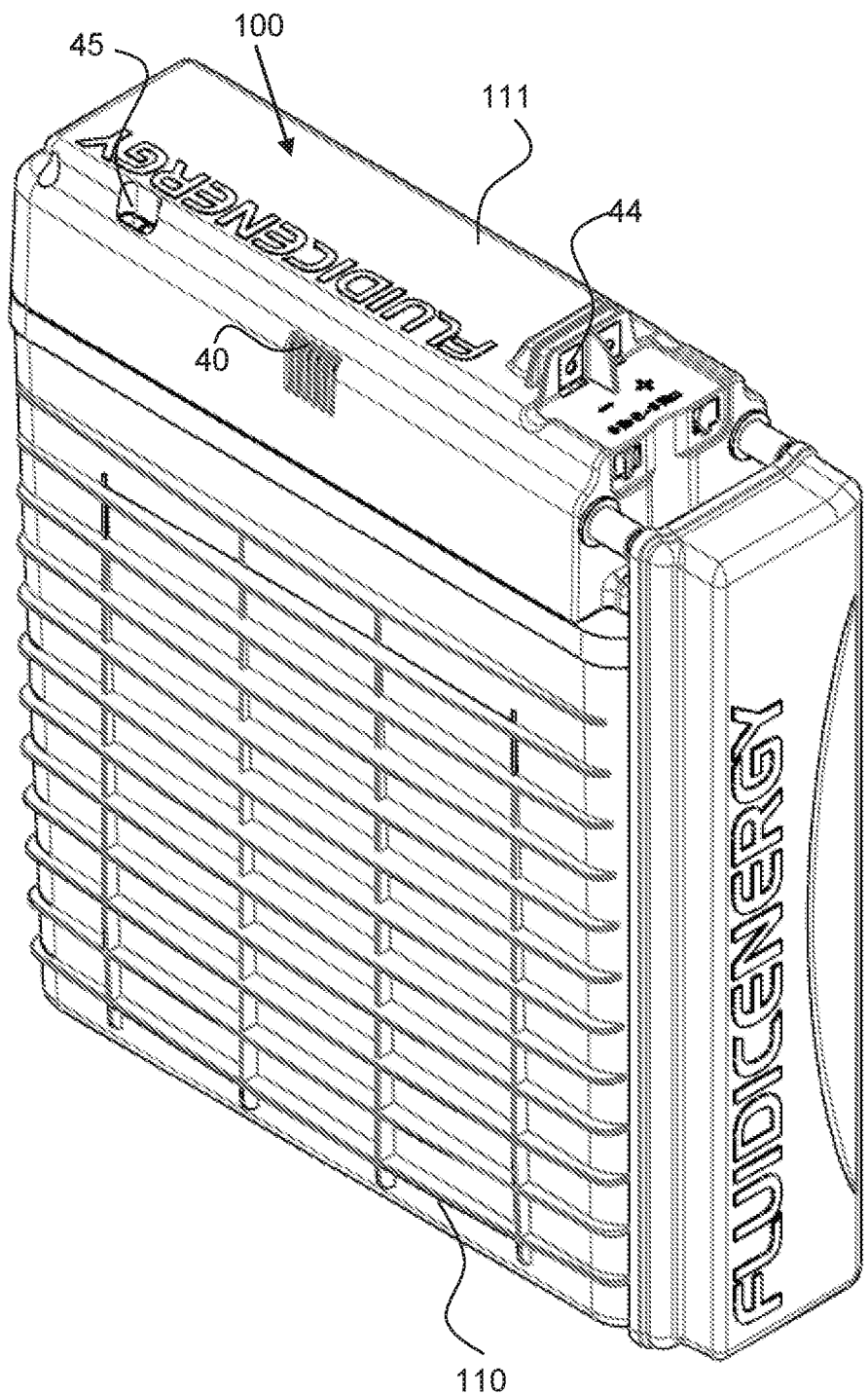
FIG. 3 shows perspective view of an exemplary electrochemical cell.

As shown in FIG. 3, an exemplary electrochemical cell 100 comprises a housing 110 for retaining a liquid electrolyte, an air inlet 40 and an exhaust or vent 45. The electrochemical cell also comprises terminals 44 for coupling to a load and/or power supply. A cover 111 extends over the cell.

Figure 4:
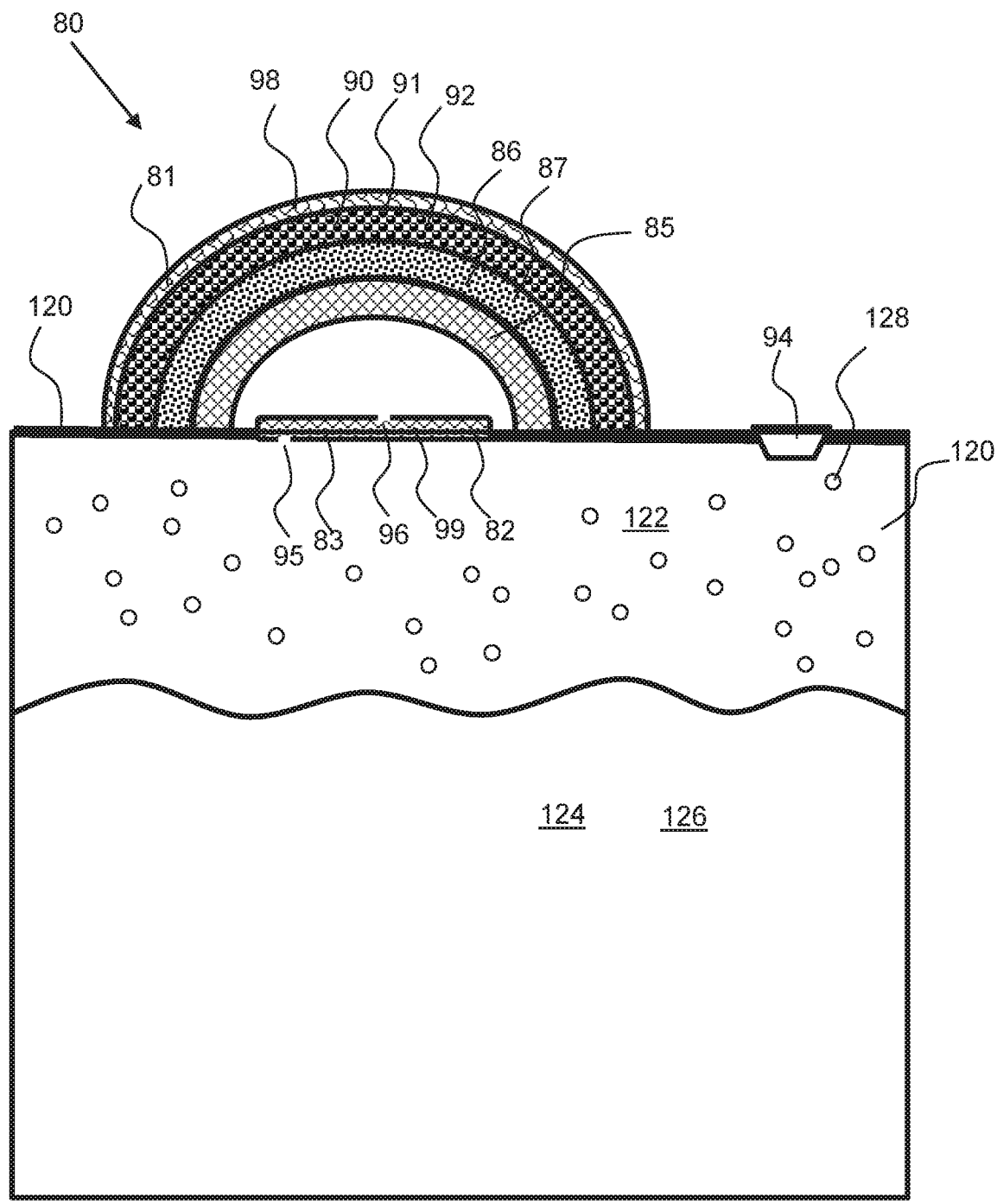
FIG. 4 shows a cross-sectional schematic of an exemplary electrochemical cell having a mist elimination system.

As shown in FIG. 4, a mist elimination system 80 is configured to reduce and/or eliminate mist 128 that evolves from the surface of the ionically conductive medium 124, the electrolyte 126, within the cell chamber 120 due to bubbling of gasses to the surface, and to prevent or substantially prevent leakage of the electrolyte in the event of an upset. The mist elimination system conserves moisture within the interior chamber 122 of the electrochemical cell 100 by preventing or substantially preventing escape of the mist 128 and through reaction of hydrogen to produce water. Also shown in FIG. 4 is a pressure relief valve 94, configured to relieve pressure from within the cell chamber 120 when required, such as when the pressure within the cell chamber exceeds a threshold pressure.

The mist eliminator system comprises a spill prevention device 82, a safety vent 83, that is in communication with the interior chamber 122 of the cell housing 110, and therefore exposed to the ionically conductive medium 124 and/or gas space there above. The exemplary safety vent comprises a tortuous path conduit 99 that will slow the transfer of any liquid electrolyte to the downstream portions of the mist eliminator system. A tortuous path conduit may be a relatively small conduit that spirals or traverses back and forth to create an extended conduit length between the interior opening 95 and the exterior opening 96.

A filter 85 is configured downstream of the safety vent and may be a concave shaped filter that will drain absorbed ionically conductive medium back into the anode chamber, as described in U.S. Pat. No. 9,269,998, Concave Gas Vent For Electrochemical Cell, to Fluidic Inc., the entirety of which is incorporated by reference herein.

The exemplary mist elimination system comprises a hydrogen recombination portion 86, with a hydrogen recombination catalyst 87 that reacts with any hydrogen to form water. The catalyst may be configured on a support material, such as particles or surfaces of the mist elimination system that are exposed to the gas exiting the cell housing from the anode space. Air may enter in to the mist elimination system through the hydrophobic filter to provide the oxygen used for the hydrogen recombination reaction. A parasitic corrosion reaction at the metal anode, or water reduction reaction, may occur in the cell corresponding to the equation $Zn+2H_2O->Zn(OH)_2+H_2$, or similar reaction depending on the type of metal used in a metal-air cell. While such hydrogen gas may be in a much smaller quantity than the evolved oxygen, it may be appreciated that the presence of hydrogen within the cell 100 is generally undesirable. In addition, it is desirable to react the hydrogen gas out of the exhaust stream from the electrochemical cell, both to prevent (or substantially prevent) egress of hydrogen from the cell and to regenerate the water lost during the corrosion reaction and return it to the cell.

The exemplary mist elimination system comprises a neutralizer portion 90 comprising a neutralizer media 91, such as an acid component 92, configured to neutralize the ionically conductive medium. For example, the ionically conductive medium may comprise a potassium hydroxide solution that is caustic, and a neutralizer may be a solid acid or acid combined with a support material, such as acid incorporated into and/or carbon. The neutralizer is configured to eliminate any reactive electrolyte that may exhaust from the anode chamber or the chamber containing the ionically conductive medium that is not captured by the mist filter material 85. A neutralizer may comprise an absorbent that will absorb and entrain or absorb and react with the ionically conductive media, such as silica, or a molecular sieve. The neutralizer may also comprise a reactive material such as a solid acid or base or a liquid acid or base entrained in a porous media such as activated carbon. If the ionically conductive media is a base, such as potassium hydroxide, the neutralizer may comprise one or more of the following acids: citric, oaxalic, carboxylic, sulfamic, benzoic, boric, sulfuric, hydrochloric, and nitric acid.

The mist elimination system 80 shown in FIG. 4 also comprises a hydrophobic filter 98 that prevents or substantially prevent moisture from outside of the cell from entering into the cell and may prevent or substantially prevent any liquid from exiting through the mist elimination system. The hydrophobic filter may also be concave or dome-shaped to facilitate the roll-off of liquid from the exterior surface and to promote roll-off of any condensation on the interior surface.

Figure 5:
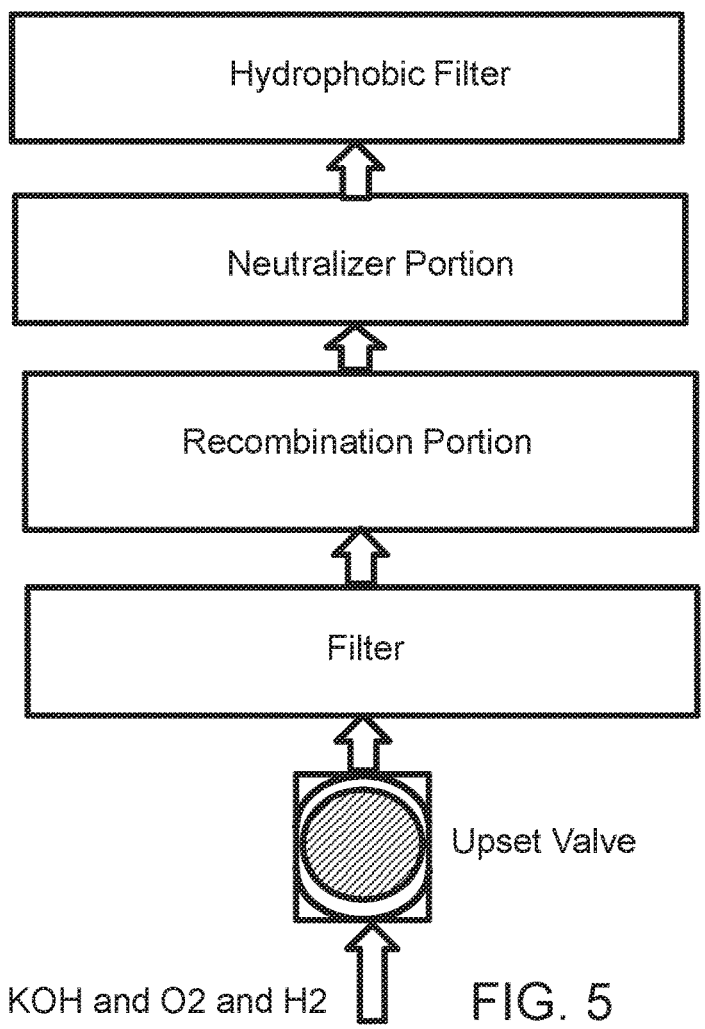
FIG. 5 shows a block diagram of an exemplary mist elimination system.
Figures 6, 7:
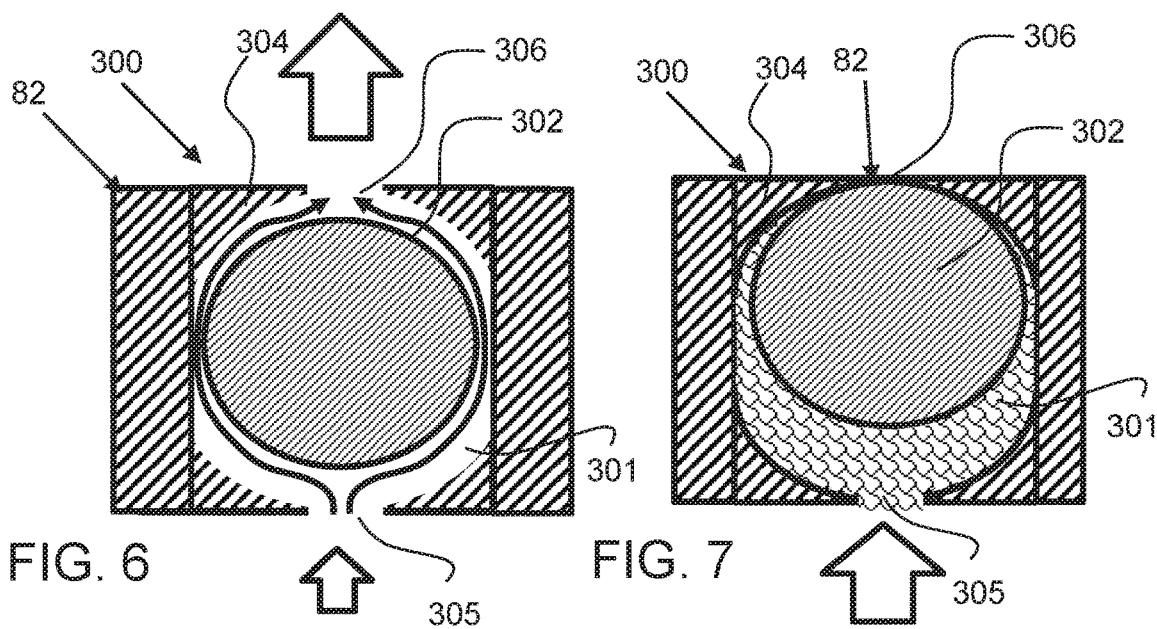
FIG. 6 shows a cross-section view of an exemplary safety valve having a ball within a conduit and a sealing seat on a downstream end of the conduit.
FIG. 7 show the exemplary safety valve shown in FIG. 6 with the ball pressed against the sealing seat and preventing liquid within the conduit from passing therethrough.

FIG. 5 shows a block diagram of a mist elimination system. As shown, potassium hydroxide, (KOH), oxygen gas ($O_2$), as well as hydrogen gas, ($H_2$), may enter into the mist elimination system. A spill prevention device such as a safety valve, as shown, in FIGS. 6 and 7 prevents or substantially prevents liquid ionically conductive media from freely flowing out of the cell chamber. The safety valve prevents or substantially prevents liquid from passing out of the cell chamber through the safety valve in the event of an upset, such as the electrochemical cell being knocked over. Downstream of the safety valve is a filter for capturing any mist that may pass through the safety valve. Downstream of the filter is a recombination portion comprising a recombination catalyst that reacts with the hydrogen to form water. Oxygen may be available from the ambient environment for this reaction and may enter through the hydrophobic filter. Downstream of the recombination portion is a neutralizer portion that reacts with any remaining electrolyte, such as KOH, to neutralize it. KOH is a base and the neutralizer media may comprise an acid component that reacts with this exemplary base to neutralize it, wherein the reaction produce products that are not acidic or basic, having a pH of between 4 and 10, for example and preferably between 5 and 9. In the event that the electrolyte is an acid, the neutralizer media may comprise a base. Downstream of the neutralizer portion is a hydrophobic filter that prevents or substantially prevents water from the ambient environment from entering into the mist elimination system. The hydrophobic filter may also prevent or substantially prevent liquid, such as electrolyte, from escaping through the mist elimination system. It is to be understood that the neutralizer portion and recombination portion may be interchanged in terms of position. In addition, a recombination portion may be configured upstream of the filter and/or upset valve in some embodiments. It is preferred to protect the recombination portion from direct exposure to the liquid electrolyte however, as this may reduce the life and effectiveness of the recombination catalyst As shown in FIGS. 6 and 7, a spill prevention device 82 is a safety valve 300 having a ball 302 configured with a conduit 301 that floats or moves within the conduit to allow gas to pass around the ball from the inlet 305 to the outlet 306. The flow of gas up and around the ball may lift the ball to allow the gas to flow around the ball, as shown in FIG. 6. When a liquid enters the safety valve however, as shown in FIG. 7, the liquid will force the ball 302 up against sealing seat 304 to prevent or substantially prevent the liquid from passing out of the outlet 306. This safety valve is therefore self-regulating and is a spill prevention valve.

Figure 8:
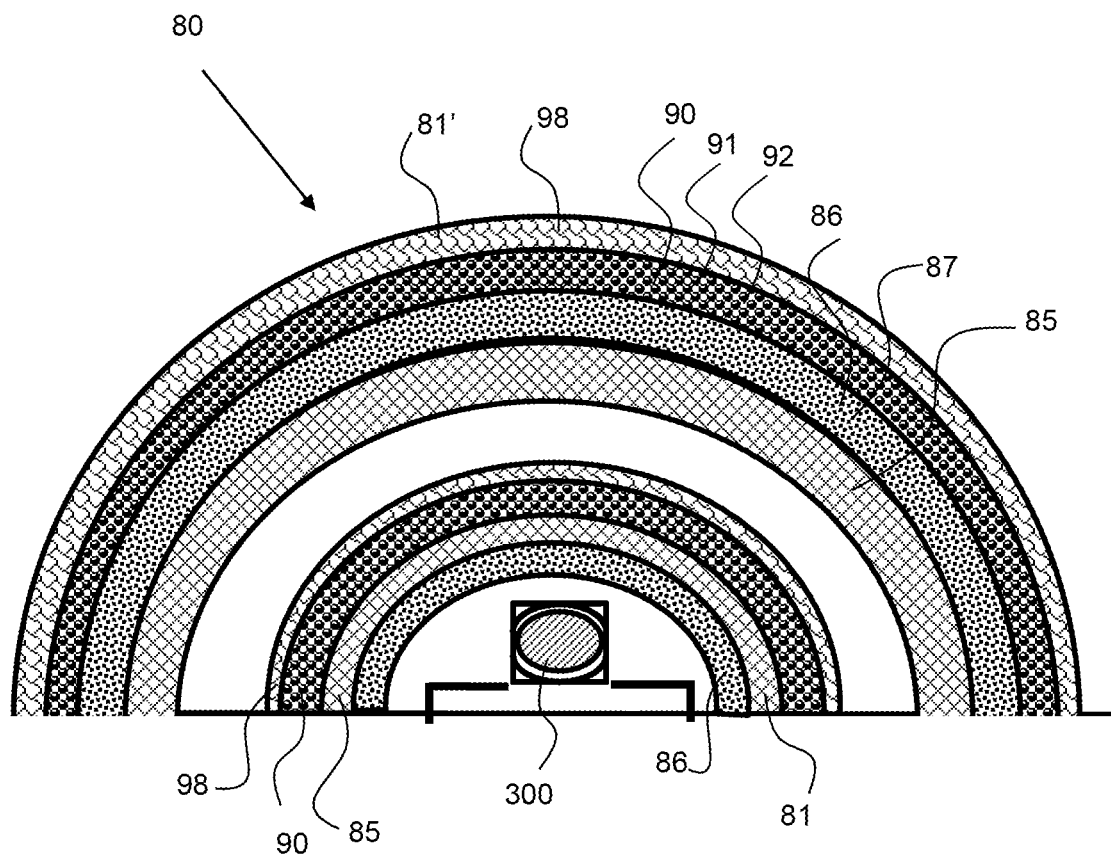
FIG. 8 shows a cross-sectional view of an exemplary mist elimination system comprising a first mist elimination stack and a second mist elimination stack.

As shown in FIG. 8, an exemplary mist elimination system 80 comprises a first mist elimination stack 81 and a second mist elimination stack 81'. A mist elimination stack comprises two or more components of a mist elimination system including, a spill prevention device, a recombination portion, a filter, a neutralize portion and a hydrophobic filter. The first mist elimination stack comprises a hydrogen recombination portion 86, a spill prevention device comprising a safety valve 300, a filter 85, a neutralizer portion 90 and a hydrophobic filter 98. There is a gap, or space between the first mist elimination stack 81 and second mist elimination stacks 81'. The second mist elimination stack 81' comprises a hydrogen recombination portion 86, a filter 85, a neutralizer portion 90 and a hydrophobic filter 98. The two layer mist elimination system better ensures that the exhaust from the cell chamber will have reduced moisture and will be neutralized. It should be appreciated that a mist elimination system may be constructed with fewer components. For example, in some embodiments, just a filter 85 may be used, or just a neutralizer 90 may be used. The number and type of mist elimination components used can be modified based on the application, use, and intended environment where the electrochemical cell will be used.

Figure 9:
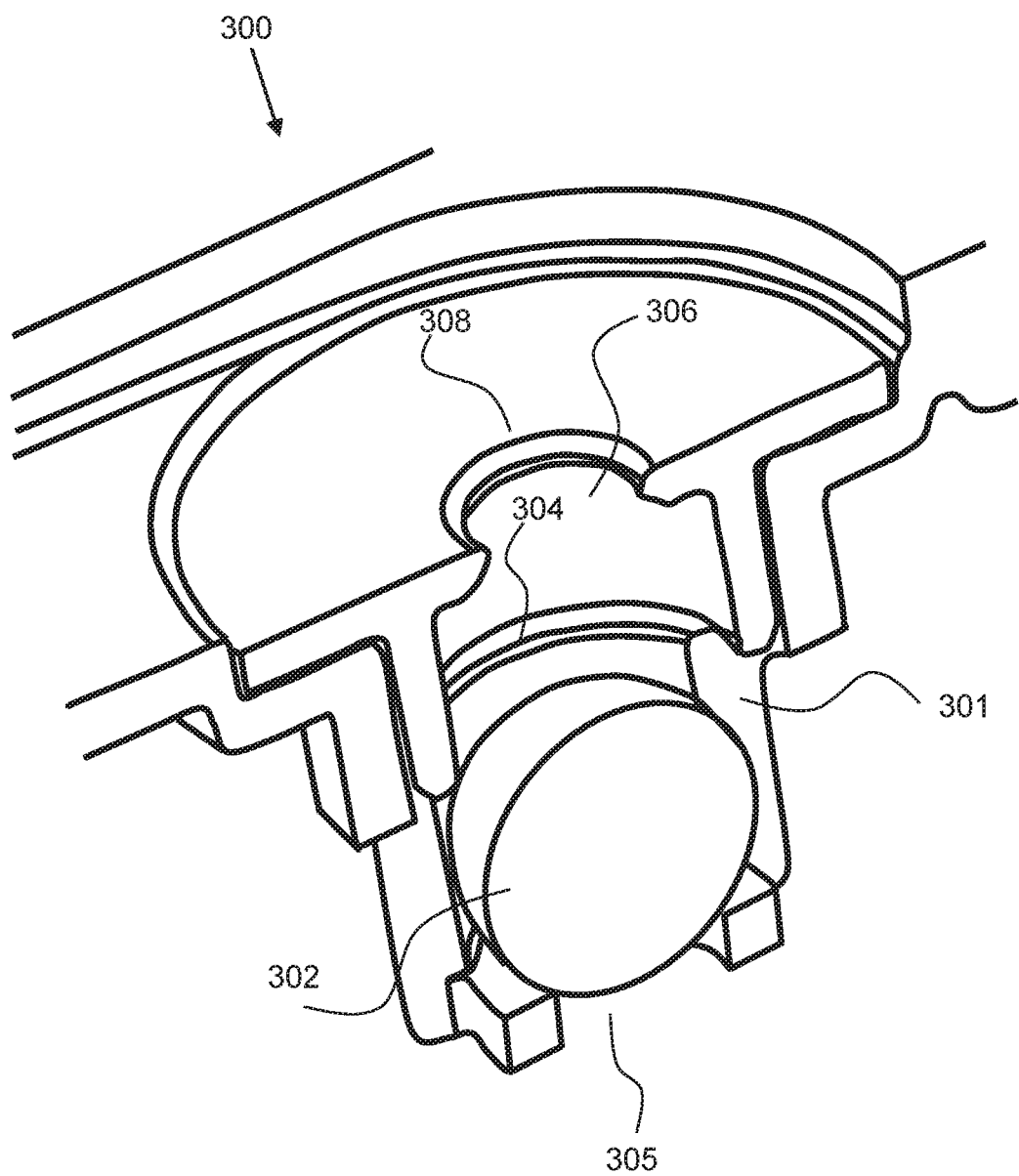
FIG. 9 shows a cross-section view of an exemplary safety valve having a ball within a conduit and a sealing seat on a downstream end of the conduit.

As shown in FIG. 9, an exemplary safety valve 300 has a ball 302 within a conduit 301 and a sealing seat 304 on a downstream end of the conduit. Fluid that condenses downstream 308 of the outlet 306 will flow down through the outlet opening, around the perimeter of the ball and through the inlet 305 back into the cell chamber, below the safety valve. Again, the ball will be forced against the sealing seat 304 and prevent (or substantially prevent) liquid from leaking from the cell chamber should the cell be tipped over.

Figure 10:
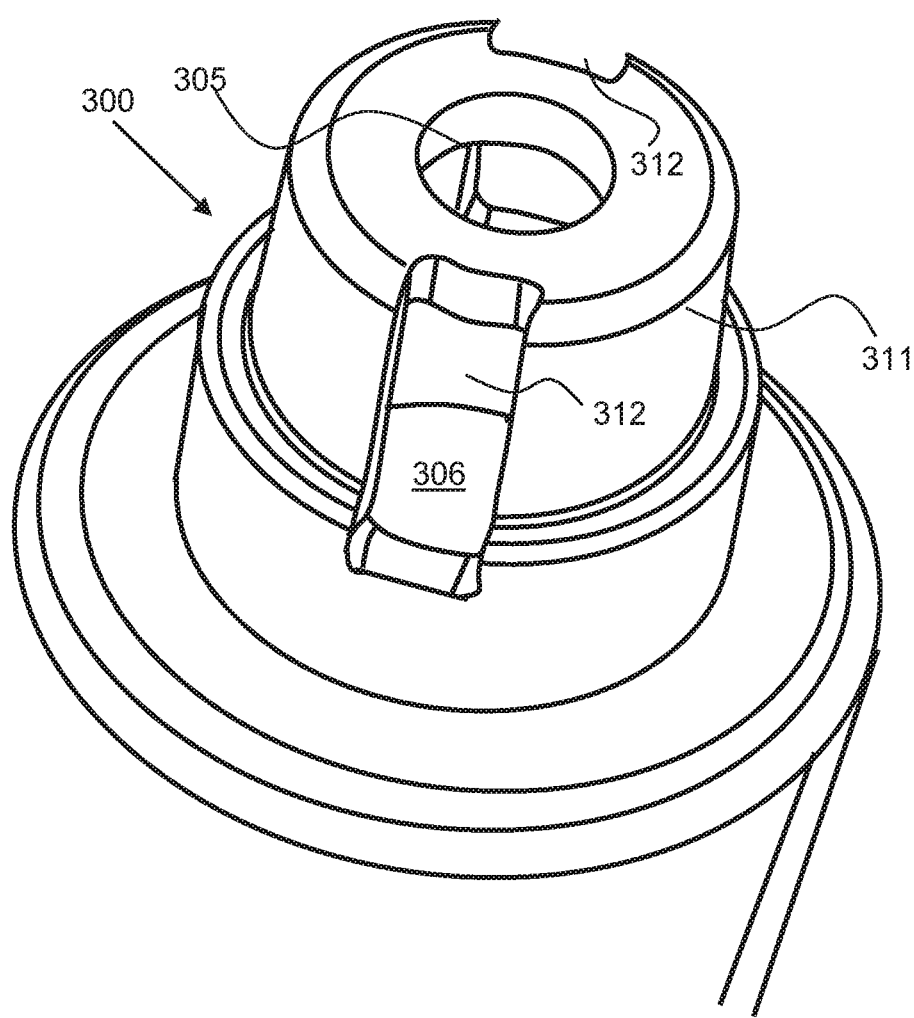
FIG. 10 shows a bottom, or inlet, view of an exemplary safety valve.

As shown in FIG. 10, an exemplary safety valve 300 has a barrel 311 for retaining the ball, not shown, and a plurality of slots 312, 312', or openings from the interior of the barrel to the exterior of the barrier to allow liquid to flow freely from the downstream side back into the cell chamber. The slots shown extend down along a portion of the length of the barrel. One, two or more slots or openings may be configured in the barrel to allow liquid to flow therethrough. The barrel is a cylindrical member for retaining the ball and allowing the ball to move up and down or along the interior of the barrel as required for ventilation or to seal the valve when there is an upset.

It will be apparent to those skilled in the art that various modifications, combinations and variations can be made in the present disclosure without departing from the spirit or scope of the disclosure. Specific embodiments, features and elements described herein may be modified, and/or combined in any suitable manner. Thus, it is intended that the present disclosure cover the modifications, combinations and variations of this disclosure provided they come within the scope of the appended claims and their equivalents.

What is claimed is:

1. An electrochemical cell comprising:
   a cell housing comprising:
   i) an air chamber;
   ii) an air chamber air inlet;
   iii) an air chamber air outlet;
   iv) an electrolyte chamber,
   an ionically conductive liquid electrolyte in the electrolyte chamber, wherein a gas space is defined in the electrolyte chamber above the electrolyte and has a cell gas;
   an oxidant reduction electrode for reducing a gaseous oxidant between the air chamber and the electrolyte chamber,
   a fuel electrode comprising a metal fuel at least partially within the electrolyte chamber;
   a mist elimination system configured between the electrolyte chamber and an exhaust vent to separate the cell gas from a mist comprising the ionically conductive liquid electrolyte; wherein the mist elimination system is configured above the volume of ionically conductive liquid electrolyte; the mist elimination system comprising:
   a spill prevention device;
   a hydrogen recombination portion, comprising a hydrogen recombination catalyst configured to react with hydrogen gas within the cell gas and form water;

a filter body portion comprised of at least one layer of filter media for capturing said mist;

a neutralizer portion comprising a neutralizer media configured to react with and neutralize the ionically conductive liquid electrolyte contained within the mist; and wherein the filter body portion contains pores to permit permeation of said cell gas therethrough, wherein the neutralizer portion is configured downstream of the hydrogen recombination portion, the filter body portion, and the spill prevention device.

2. The electrochemical cell of claim 1, wherein the spill prevention device comprising a tortuous path conduit, from an inlet to an outlet, for transferring cell gas therethrough;

wherein the tortuous path conduit inlet faces the electrolyte chamber for receiving cell gas.

3. The electrochemical cell of claim 1, wherein the spill prevention device comprises a safety valve.

4. The electrochemical cell of claim 3, wherein the safety valve comprises a ball retained within a conduit having a sealing seat on a downstream side, wherein the ball is pressed against the sealing seat to prevent liquid passage through the safety valve when liquid enters the conduit.

5. The electrochemical cell of claim 1, wherein the filter body portion is formed in a concave shape with an apex directed upwardly in the cell's upright orientation, and body surface extending downwardly from said apex so as to drain absorbed ionically conductive medium back into the electrolyte chamber.

6. The electrochemical cell of claim 1, wherein the water from the reaction of hydrogen with the recombination catalyst is introduced back into the cell through the spill prevention device.

7. The electrochemical cell of claim 1, wherein the hydrogen recombination catalyst is selected from the group consisting of: perovskites, spinels, precious metal based-platinum, palladium, $MnO_2$, Nickel and a combination thereof.

8. The electrochemical cell of claim 1, wherein the hydrogen recombination portion is configured downstream of the spill prevention device.

9. The electrochemical cell of claim 1, wherein the neutralizer media comprises an acid component.

10. The electrochemical cell of claim 1, wherein the neutralizer media comprises an acid component selected from the group consisting of: citric, oxalic, carboxylic, sulfamic, benzoic, boric, sulfuric, hydrochloric, and nitric acid.

11. The electrochemical cell of claim 1, wherein the neutralizer media comprises a solid acid.

12. The electrochemical cell of claim 1, wherein the mist elimination system further comprises a hydrophobic filter configured downstream of the neutralizer portion on an exhaust end of the mist elimination system.

13. The electrochemical cell of claim 12, wherein the hydrophobic filter comprises a fluoropolymer filter media.

14. The electrochemical cell of claim 12, wherein the hydrophobic filter comprises an expanded microporous fluoropolymer filter media.

15. The electrochemical cell of claim 1, wherein the mist elimination system comprises a first mist elimination stack and a second mist elimination stack, wherein each of the first mist elimination stack and the second mist elimination stack comprises: the hydrogen recombination portion, the filter body portion, and the neutralizer portion, wherein each filter body portion contains pores to permit permeation of said cell gas therethrough, wherein each neutralizer portion is configured downstream of the hydrogen recombination portion and the filter body portion in their respective stack, and wherein the second mist elimination stack is stacked over the first mist elimination stack.

16. The electrochemical cell according to claim 1, wherein the spill prevention device comprises a safety valve comprising:

a ball retained within a conduit;

a sealing seat on a downstream side of said conduit, wherein the ball is pressed against the sealing seat to prevent liquid passage through the safety valve when liquid enters the conduit; and wherein the mist elimination system further comprises:

a hydrophobic filter, wherein the hydrophobic filter is configured on an exhaust end of the mist elimination system;

and wherein the hydrophobic filter is configured downstream of the neutralizer portion and is on an exterior of a mist elimination system.

17. The electrochemical cell of claim 1, wherein the mist elimination system comprises a stack comprising the hydrogen recombination portion, the filter body portion, and the neutralizer portion.

18. The electrochemical cell of claim 1, wherein the fuel electrode is positioned apart from the oxidant reduction electrode, thereby defining a gap, and wherein said ionically conductive liquid electrolyte is in the gap.

* * * * *